June 13, 1933.  E. E. MILLS  1,913,767
MEASURING DISPENSING APPARATUS
Filed April 26, 1932
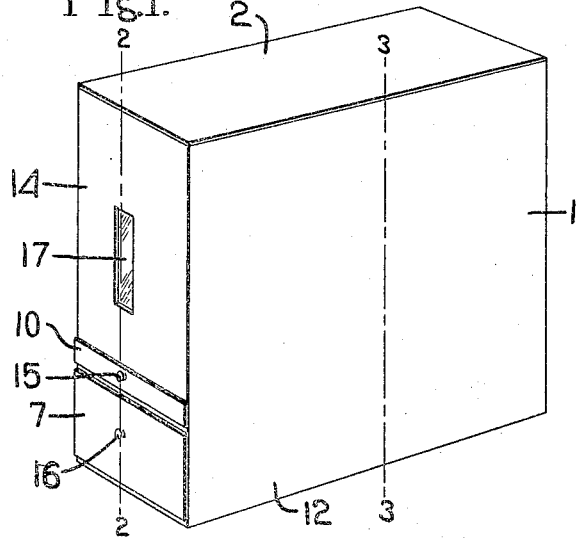
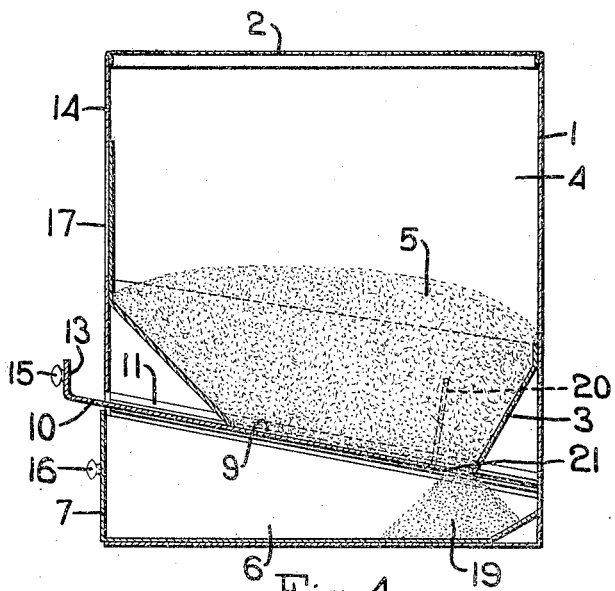
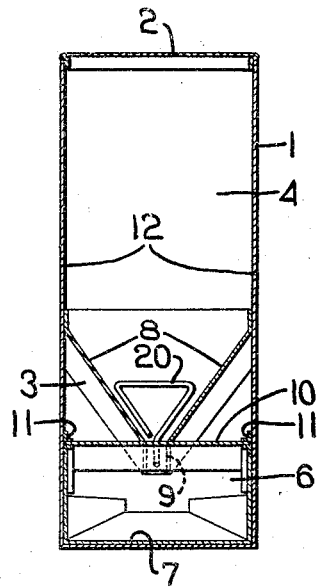
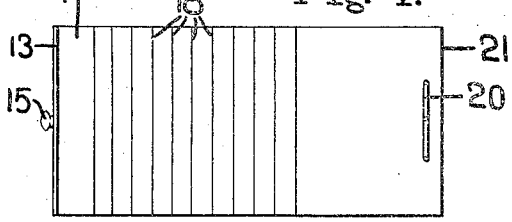
Inventor:
Ernest E. Mills
by Heard Smith & Tennant.
Attys.

Patented June 13, 1933

1,913,767

UNITED STATES PATENT OFFICE

ERNEST E. MILLS, OF BOSTON, MASSACHUSETTS

MEASURING DISPENSING APPARATUS

Application filed April 26, 1932. Serial No. 607,546.

This invention relates to measuring dispensing apparatus and particularly to such apparatus used for dispensing dry granular material.

The object of the invention is to provide a convenient, easily operated and accurate device for measuring a quantity of material such as ground coffee or other material of like character.

A particular object of the invention is to provide a measuring device which is of simple construction and low cost of manufacture particularly adapted for domestic use.

Other objects and features will more fully appear from the following specification in connection with the accompanying drawing and will be pointed out particularly in the claims.

A device constructed under the principles of the present invention is of great utility in measuring and dispensing various food products, such as coffee, sugar and material of like character.

In preparing the various cooked dishes in the home or hotel, it is important that the ingredients be measured carefully in order to produce uniform results. There is a tendency for the person cooking to neglect to measure properly the ingredients entering into the article being prepared. This lack of care is due chiefly to lack of efficient measuring devices. For instance, in preparing coffee to supply a given number of cups a definite amount of ground coffee must be used. The usual method is to measure the coffee roughly by means of a spoon or other similar implement. In thus measuring the material it is very often the case that on different occasions different measuring devices are used which may or may not be of the same capacity. This procedure not only produces uncertain results, but also is extremely wasteful since it is usually the case that more of the coffee is used than is actually necessary. In so doing a uniform high quality of the brewed coffee is impossible to attain.

The present invention not only supplies the means for accurately measuring the required amount of material, but also serves as an efficient container for storing the material.

The device consists essentially of a casing of any desired form, preferably rectangular. The casing is open at its upper end and provided with a suitable removable cover. A substantially horizontal partition divides the casing into an upper chamber which serves as a storage compartment for the material and a lower compartment into which the material is dispensed. In the lower compartment a suitable removable receptacle is fitted into which the measured quantity of material is delivered.

The partition is provided with a relatively narrow slot, preferably extending substantially throughout the length of the casing and has associated therewith an adjustable slide which is operable to close the slot entirely or to uncover the slot any predetermined amount. The slide is provided with a series of indication marks which are designed to register with the front wall of the casing to cause the device to deliver a quantity of material into the removable receptacle equal to the amount indicated on the particular indication mark, which is in registration with the wall of the casing. Other suitable means than that presented herein may be used to indicate to the operator of the device the proper position of the slide to deliver a given amount of material.

In the drawing:

Fig. 1 is a general view of the device in perspective.

Fig. 2 is a vertical longitudinal cross section on line 2—2 Fig. 1.

Fig. 3 is a transverse sectional view on line 3—3 Fig. 1.

Fig. 4 is a detailed view of the measuring slide showing the arrangement of indication marks thereon.

In order to present clearly the principles of the invention, a particular embodiment thereof is illustrated and will be described herein. The elements of the invention are enclosed within a casing 1 of any suitable form and of a size proportional to the quantity of material which it is desired to purchase at one time. While the device may be used to dispense any dry granular material, the device shown herein is designed particularly for dispensing ground coffee. The casing 1 is open at its upper end and provided with a suitable cover 2. The space within the chamber is divided by a partition 3 into two chambers, a storage chamber 4 above the partition in which is received the material 5, and a lower chamber 6 into which the material is dispensed.

In order to facilitate removal of the measured quantity of material a removable receptacle 7 is provided which substantially fills the lower chamber 6. The partition 3 desirably is concave in form having flat sloping slides 8 which assist in guiding the material toward a substantially central slot 9 in the partition, the sloping slides 8 desirably terminating at the edges of the slot. The slot 9 is closed normally by a slide 10 which is mounted movably in the casing in position to engage closely the edges of the slot 9, thereby retaining the material in the storage chamber. The slide 10 is guided longitudinally and supported by means of guiding slots 11 formed in the sides 12 of the casing which may be separately constructed members secured to the inner face of the sides 12 of the casing. The outer end of the slide 10 desirably is turned upward to form a closure 13 which bears against the front wall 14 of the casing when the slide is in closed position. A suitable handle 15 is secured to the closure 13 to enable the slide to be withdrawn manually. The removable receptacle 7 is provided also with a handle 16, by means of which it is withdrawn from the casing with the measured quantity of material therein. For the convenience of the user of the device a sight opening 17 is provided in the front wall 14 of the casing and is closed by means of a piece of glass or transparent material thus enabling the user to observe when the quantity of material in the storage chamber is consumed substantially or entirely.

The operation of the device is very simple and at the same time positive and accurate. The material when purchased is placed in the storage chamber 4 which is, or may be substantially air-tight, and therefore will preserve the freshness of the material during the period before consumption. When it is desired to obtain a measured quantity of the material, the slide 8 is withdrawn a predetermined amount depending upon the desired quantity. The amount to which the slide must be withdrawn to deliver the portion of material desired is indicated directly upon the slide itself. For this purpose a series of indication marks 18 are formed on the slide as shown in Fig. 4. If the material is ground coffee the device is calibrated by spacing the calibration marks 18 the proper distance apart upon the slide to deliver the proper amount of coffee to make one, two, three or any desired number of cups of coffee. The calibration marks desirably are so positioned with relation to the casing that when the slide is withdrawn the proper predetermined amount, the corresponding calibration mark will register with the front wall 14 of the casing.

When the normally closed slide 10 is withdrawn partially or wholly the slot 9 is uncovered, and the material 5 flows downward into the removable receptacle 7, and a mass of material 19 is formed therein. As the mass of material accumulates in the receptacle 7, its depth gradually increases until the top of the mass closes the slot 9, thereby stopping the flow of material. The slide 10 then is closed preventing any further flow of material and the receptacle 7 is removed with the measured mass of material 19 therein, the amount of material in the mass being proportional to the extent to which the slot 9 is uncovered by the slide 10. For instance if the slide is withdrawn until the slot 9 is uncovered completely, the maximum amount of material is delivered to the container 7, while any intermediate quantity may be delivered thereto by moving the slide until the desired indication mark registers with the front wall of the casing.

A device constructed under the principles of the invention provides an efficient means to separate an accurate quantity of material from a mass quickly and with a minimum of effort in contrast to the usual method of measuring material, for instance the ingredients of cooked food. The crude method usually employed is to provide a small container in addition to the storage container which holds one or more units or fractions of a unit, and must be dipped into the mass of material in the storage container. When thus proceeding the cover of the storage container must be removed, and in the process of either dipping the measuring container into the mass or pouring the mass into the container invariably a certain amount of the material is spilt and thereby wasted. Furthermore, it is practically impossible to obtain an accurate division of the material by this means since the material thus measured in one instance may be packed loosely in the measuring container, while in another instance the material may be packed firmly and the resulting quantity measured will vary thereby throughout wide limits. This is true even though the measuring container is filled exactly to a given indication mark. On the other hand when the measuring device presented by the present invention is calibrated accurately, the human elements of judgment and skill in measuring the material are not present. When the slide is withdrawn to a predetermined position, the resulting measured quantity is determined solely by the force of gravity causing the flow of the material from the storage compartment to the dispensing receptacle and the size of the opening in the partition. Obviously during this operation there is no chance for wastage due to spilling.

It has been found by experiment that during the operation of the device the material in the storage chamber will be dispensed smoothly and without interruption until the entire contents thereof is consumed. It may be desired however in rare cases when the character of the material dispensed differs widely from the sort of material suggested herein that an agitating device be employed. A suggested means for agitating the material is presented in the drawing consisting of a projection 20 situated closely adjacent the lip 21 of the slide 9. The projection 20 extends upward into the mass of material in the storage chamber and operates to agitate the material when the slide is moved, and thereby prevents the material in the storage chamber from assuming a condition which will interfere with the proper flow of the material when the slide is withdrawn.

Having thus described the invention, what is claimed as new, and desired to be secured by Letters Patent, is:

1. Measuring dispensing apparatus for dry granular material comprising a casing, a partition in the lower portion of the casing having a long narrow opening therein, a storage chamber above said partition, a dispensing chamber below said partition, a removable receptacle in said dispensing chamber, calibrated measuring means normally closing said opening and operable to uncover it by movement of the measuring means along the largest dimension of the opening and permit the material to fall by gravity into said receptacle until the mass of material therein closes said opening whereby a quantity of material is delivered to the receptacle measurable by the position of the measuring means.

2. Measuring dispensing apparatus for dry granular material comprising a casing, an angularly-disposed concave partition in said casing having its area sloping downwardly from its periphery to its central portion and having a long narrow opening substantially centrally thereof, a dispensing chamber below said partition, a removable receptacle in said dispensing chamber and manually-operable calibrated measuring means to vary the size of said opening in said partition along its greatest dimension whereby when the material is permitted to flow through the opening a quantity of material flows into said receptacle until the mass therein closes the opening in the partition and stops the flow, whereby a quantity of material is delivered into said receptacle measurable by the size of said opening, such quantity being determined by the calibrations on said measuring means.

3. Measuring dispensing apparatus for dry granular material comprising a casing, an angularly-disposed partition in said casing having a long narrow slot therein, a storage chamber above said partition, a dispensing chamber below said partition, a removable receptacle in said dispensing chamber below said slot, a slide movable lengthwise of said slot manually operable to vary the opening presented by said slot and to permit material in said storage chamber to flow by gravity into said receptacle until the mass of material therein closes the portion of the slot uncovered by the slide thus stopping the flow of material whereby a quantity of material is delivered to said receptacle measurable by the position of said slide and indication marks on said slide to enable a predetermined quantity of the material to be measured.

4. Measuring dispensing apparatus for dry granular material comprising a casing, an angularly-disposed partition in said casing having a slot therein, a storage chamber above said partition, a dispensing chamber below said partition, a removable receptacle in said dispensing chamber below said slot, a slide manually operable to close or vary the opening presented by said slot, said slide, when uncovering said slot, permitting the material in the storage chamber to flow by gravity into said receptacle until the mass of material therein closes the portion of the slot uncovered by the slide thus stopping the flow of material whereby a quantity of material is delivered to said receptacle measurable by the position of said slide and agitating means secured to said slide operable to assist the flow of material.

In testimony whereof, I have signed my name to this specification.

ERNEST E. MILLS.